April 10, 1951 W. D. LEWIS 2,548,672

MULTIRESONANT WAVE GUIDE STRUCTURE

Original Filed Dec. 5, 1947

INVENTOR
W. D. LEWIS
BY H. O. Wright
ATTORNEY

Patented Apr. 10, 1951

2,548,672

UNITED STATES PATENT OFFICE 2,548,672

MULTIRESONANT WAVE-GUIDE STRUCTURE

Willard D. Lewis, Little Silver, N. J., assignor to Bell Telephone Laboratories, Incorporated, New York, N. Y., a corporation of New York Original application December 5, 1947, Serial No. 789,985. Divided and this application July 26, 1949, Serial No. 106,759

3 Claims. (Cl. 178—44)

Figure 1:
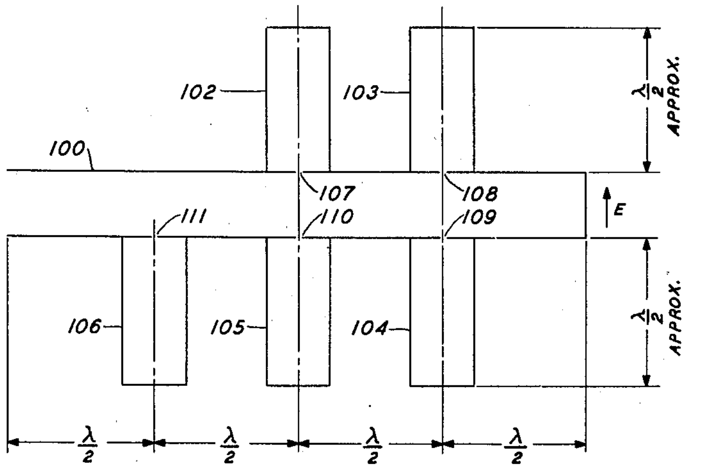

This invention relates to improved forms of electrically multiresonant reactive structures adapted for use over the frequency range extending from approximately 300 megacycles up to and including "millimeter wavelength" frequencies. For the purposes of this application this frequency range will be referred to as the "microwave" frequency range. More particularly the invention in specific forms relates to wave-guide structures which simulate closely, over the above-mentioned frequency range, the electrical characteristics of complex multiresonant reactive combinations of the low-frequency lumped-element electrical network art.

This application is a division of my copending application Serial No. 789,985 filed December 5, 1947, now Patent No. 2,531,447 issued November 28, 1950, entitled "Hybrid Channel Branching Microwave Filters."

A principal object of the invention is to provide wave-guide structures by means of which the complex reactive characteristics of the low-frequency lumped-element network art can be closely simulated at frequencies greater than approximately 300 megacycles.

Another object is to provide complex reactive structures for use at "microwave" frequencies which are readily constructed and adjusted.

Further objects will become apparent during the course of the detailed description of specific illustrative structures of the invention given below.

The major principles underlying the structures of the invention are that firstly, as taught in United States Patent 2,445,895 issued July 27, 1948, to W. A. Tyrrell, connections or couplings made to a wave guide in the E-plane (see Fig. 2 of the Tyrrell patent) are in effect series connections or couplings while connections or couplings made to a wave guide in the H-plane (see Fig. 4 of the Tyrrell patent) are in effect parallel connections or couplings and secondly, if several reactive devices are connected or coupled to a wave guide, and their respective coupling points are spaced along the wave guide, at intervals of substantially one-half wavelength of the frequency of the energy to be transmitted along the wave guide the effect will be, for most practical purposes, very closely similar to that which would be obtained were it practicable to connect or couple all of the reactive devices to a single point along the wave guide.

As is explained in the above-mentioned patent to Tyrrell, one of the most convenient forms of wave guide is that comprising a tube of highly conductive material such as copper or brass having a rectangular cross-section, one cross-sectional dimension being considerably smaller than the other and both cross-sectional dimensions being appreciably less than one-half wavelength. (For an elementary discussion of "wave guides and resonators" see also the "Radio Engineering Handbook" by F. E. Terman, pages 251 to 273, inclusive, published by McGraw-Hill Book Company, New York, 1943, and the references cited therein.) To simplify the discussion and illustration of the principles of the invention, a wave guide of the above-indicated type will be employed in the illustrative structures shown in the accompanying drawing. It will be, however, obvious to those skilled in the art that the principles of the invention can be readily applied to structures in which numerous other types of wave guides, i. e., round, square and the like are used. By way of example, assuming that frequencies in the neighborhood of 4000 megacycles are to be employed, suitable and convenient internal cross-sectional dimensions for wave guides to be used at such frequencies are 1 by 2 inches.

As will be obvious from the above-mentioned portion of Terman's "Radio Engineer's Handbook" resonant cavities for use in conjunction with wave guides can have any of a large number of shapes. To further simplify the discussion and illustration of the principles of the invention a very simple type of resonator will be employed in the accompanying drawing, which type comprises a section of wave guide of the same cross-sectional dimensions as the main wave guide of the figures and having a length of substantially one-half wavelength of the frequency at which resonance is desired for each of the resonant cavities, respectively. It will be obvious, however, to those skilled in the art that numerous other types of resonators can be employed without departing from the spirit and scope of the invention.

As is well known to those skilled in the art, coupling to a wave guide or a cavity or between a cavity and a wave guide can be effected by orifices, which may assume numerous shapes and may be adjusted in size and/or position to determine the degree of coupling, or alternatively probes, loops, and the like, can be employed and can be adjusted in size and/or position to afford the desired degree of coupling. In the interest of simplicity plain slit orifices will be indicated in the illustrative embodiments but it is to be understood as obvious to those skilled in the art that numerous distinctly different types of couplings could equally well be used and appropriately rearranged structural configurations of widely varying character could thus be obtained.

Figure 2:
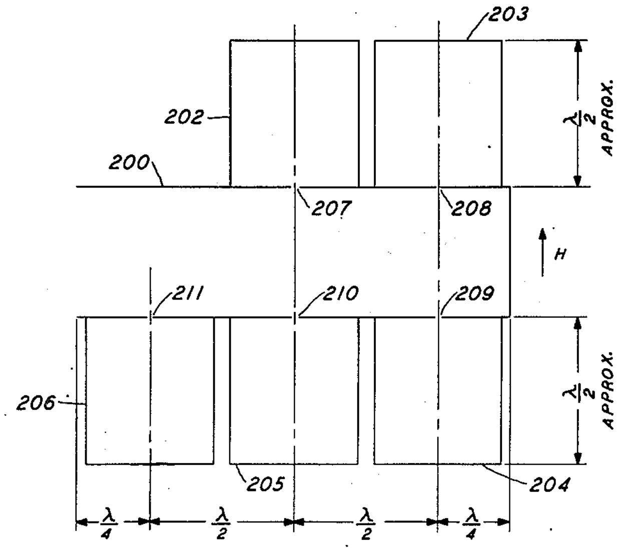

The nature of the invention will be more readily comprehended from the detailed description of simple specific structures given below, taken in conjunction with the appended drawing in which:

Fig. 1 shows a wave-guide structure which is the very high frequency or "microwave" equivalent of the low-frequency, lumped-element network consisting of a plurality of series resonant circuits connected in parallel; and Fig. 2 shows a wave-guide structure which is the very high frequency or "microwave" equivalent of the low-frequency, lumped-element network consisting of a plurality of parallel resonant (antiresonant) circuits connected in series.

In more detail in Fig. 1 a portion of wave guide 100, having a rectangular cross-section, and being closed at the right end and open at the left end, has coupled thereto a plurality of resonant cavities 102 to 106, inclusive, by means of irises 107 to 111, inclusive, respectively.

The cavities 102 to 106, inclusive, can be, for example, sections of wave guide approximately one-half wavelength long between the end coupled to wave guide 100 as above described and the end more remote from the wave guide 100. Their lengths will vary slightly so that each will have a different resonant frequency in the frequency range of interest.

For frequencies in the neighborhood of 4000 megacycles, by way of example, both wave guide 100 and cavities 102 to 106, inclusive, can have cross-sectional internal dimensions of approximately 1 by 2 inches. The right end of wave guide 100 and the free ends of cavities 102 to 106, inclusive, are all closed. The side walls and ends of guide 100 and cavities 102 to 106, inclusive, are made of plane sheets of highly conductive material such as copper or brass.

In Fig. 1 the cavities 102 to 106, inclusive, are coupled to the broader sides of guide 100, the coupling points being spaced along the main guide 100 at intervals of one-half wavelength in the guide of the median frequency of the frequency range over which the structure is to be employed. The end cavities 103, 104 and 106 are coupled to points spaced the above-mentioned one-half wavelength from the nearer ends of guide 100, respectively. As is well known to those skilled in the art, a half-wavelength section of a transmission line introduces no impedance transformation. The short circuit at the end of guide 100 is therefor effectively connected between cavities 103 and 104 completing the "series" connection of all the resonant cavities. Any whole number of half wavelengths of wave guide can, obviously, be used in lieu of a single half wavelength both between coupling points and between the ends of wave guide 100 and the nearest coupling points.

Each of the cavities 102 to 106, inclusive, can be of the type described in connection with Fig. 12 of my above-mentioned copending parent application, the lengths of the cavities being adjusted to slightly different values to provide slightly different frequencies of resonance, as is well understood by those skilled in the art. The irises 107 to 111, inclusive, can be slits extending across the guide 100 in planes perpendicular to the paper, or they can be round, oval, or variously shaped to provide a appropriate degree of coupling and effective broadness of resonance, as is explained in my above-mentioned parent application, and as is well understood by those skilled in the art.

The structure of Fig. 2 differs from that of Fig. 1 in that the portion of wave guide 200 is positioned with its broader dimension vertical and the cavities 202 to 206, inclusive, are coupled to the narrower sides of guide 200, as illustrated. Also the coupling points for the end cavities 203, 204 and 206 are spaced one-quarter wavelength of the mid-frequency of the band of frequencies with which the structure is to be employed, from their respective nearer ends of guide 200. Alternatively the last-mentioned coupling points can be spaced any odd number of one-quarter wavelengths from the ends of guide 200 instead of one quarter, as may be convenient. As is well known in the art, a quarter wavelength of transmission line transforms a low impedance connected to it at one end into a very high impedance at the other end of said line section. Therefore the short circuit introduced by closing the right end of guide 200 appears at the orifices 208 and 209 as a very high impedance and has very little effect upon the impedance of resonators 203, 204 or of the entire structure. With respect to the left (open) end of wave guide 200 it is optional whether the coupling point of resonator 206 be one-quarter or one-half wavelength away. If the one-quarter wavelength spacing is employed, as shown, the over-all impedance characteristic of the whole structure will appear at the left end of guide 200 as the inverse of that which would appear were the one-half wavelength spacing used. In view of Foster's theorem (see the paper entitled "A Reactance Theorem" by Ronald M. Foster, Bell System Technical Journal, volume III, No. 2, April 1924, pages 259 to 267, inclusive) it is mainly a matter of convenience in construction which determines whether a series or a parallel arrangement of reactances should be used and by a simple shift in frequency an inverse characteristic impedance can obviously be made to serve in lieu of its converse.

The irises 207 to 211, inclusive, in the cavities 202 to 206, inclusive, respectively, can again be slits extending across the upper or the lower surface of guide 200, as the case may be, perpendicular to the plane of the paper, or they can be round, oval or variously shaped as for those of Fig. 1. As in Fig. 1 these orifices should be spaced an even number of half wavelengths apart.

In the structures of Figs. 1 and 2 the number of resonant cavities can be increased or decreased as may be necessary to provide the desired number of resonances, so long as the spacings between adjacent cavities are a whole number of half wavelengths, and the end cavities are spaced the specified distances, as described above, from the ends of the longer sections of waveguide 100 or 200, respectively. For example if only three resonances were required cavities 102 and 103 of Fig. 1 or cavities 202 and 203 of Fig. 2 could be omitted and the upper side of the guide made continuous (without orifices, etc.) in each instance. Mechanical convenience or space requirements might also be better served by placing all cavities along one side only of the longer section of waveguide.

A number of uses of devices of the invention are described and illustrated in my above-mentioned copending parent application, (see Fig. 20 and the description thereof, for example,) and also in the copending application of D. H. Ring Serial No. 68,361 filed December 30, 1948. (See Figs. 12, 14, 15 and 16 and the description thereof.)

It is apparent that numerous modifications can be made, by those skilled in the art, in the above-described illustrative structures of the invention, without departing from the spirit and scope of the invention. For example, round or square wave guides and variously shaped resonator cavities and irises or other types of couplings can be employed, provided waves with appropriately oriented electric and magnetic vectoral components are transmitted through the guide, as is well understood by those skilled in the art.

What is claimed is:

1. A wave-guide structure providing the microwave equivalent of a plurality of parallel resonant circuits connected in series, said structure comprising a first section of wave guide closed at one end and open at the other, and a plurality of cavity resonators tuned to resonate at a plurality of frequencies, respectively, each resonator comprising a short section of wave guide closed at one end and coupled at the other end through an iris to said first section of wave guide, the resonators being spaced a distance of $\lambda/2$, center to center, along said first section of wave guide, the resonators nearest the ends of the said first wave-guide section being spaced a whole number of half wavelengths from the center of said resonators to said ends, respectively, the resonators being connected with their longitudinal axes parallel with the plane in which will lie the electrical vector of the waves with which said wave-guide section is designed to be used.

2. A wave-guide structure providing the microwave equivalent of a plurality of series resonant circuits connected in parallel, said structure comprising a first section of wave guide closed at one end and open at the other, and a plurality of cavity resonators tuned to resonate at a plurality of frequencies, respectively, each resonator comprising a short section of wave guide, closed at one end and connected at the other end through an iris to said first section of wave guide, the resonators being spaced a distance of $\lambda/2$, center to center, along said first section of wave guide, the resonators nearest the ends of the wave-guide section being spaced an odd number of quarter wavelengths from the center of said resonators to said ends, respectively, the resonators being connected with their longitudinal axes parallel with the plane in which will lie the magnetic vector of the waves with which said wave-guide section is designed to be used.

3. A multiresonant structure for microwave systems comprising a section of wave guide closed at one end, a first plurality of resonant cavities coupled to a like plurality of points along a first side of said wave guide, respectively, each of said points being spaced an even number of half wavelengths from adjacent coupling points and a second plurality of resonant cavities coupled to a second like plurality of points along a second side of said wave guide, said second side being opposite said first side, each of said second like plurality of points being spaced an even number of half wavelengths from adjacent coupling points of said second plurality of points, some of said plurality of points being directly opposite points of said first-mentioned plurality of points.

WILLARD D. LEWIS.

REFERENCES CITED

The following references are of record in the file of this patent:

UNITED STATES PATENTS

| Number | Name | Date |
|---|---|---|
| 2,106,768 | Southworth | Feb. 1, 1938 |
| 2,238,438 | Alford | Apr. 15, 1941 |
| 2,432,093 | Fox | Dec. 9, 1947 |
| 2,438,367 | Keister | Mar. 23, 1948 |

FOREIGN PATENTS

| Number | Country | Date |
|---|---|---|
| 536,171 | Great Britain | May 6, 1941 |